July 8, 1952
N. M. HAYNES
2,602,913
AUTOMATIC OPERATION SYSTEM FOR RECORDERS
Filed April 10, 1948
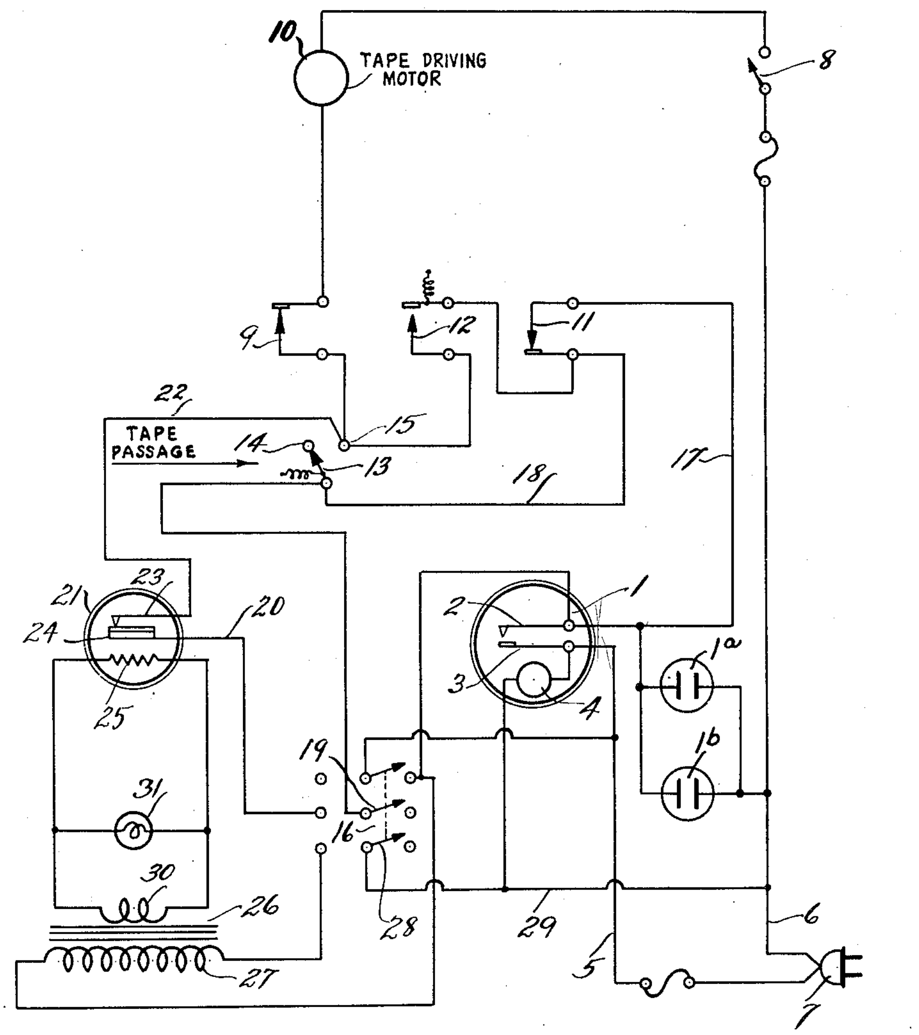
INVENTOR.
Nathan M. Haynes
BY S. Stephen Baker
ATTORNEY.

Patented July 8, 1952 2,602,913

UNITED STATES PATENT OFFICE 2,602,913

AUTOMATIC OPERATION SYSTEM FOR RECORDERS

Nathan M. Haynes, New York, N. Y.

Application April 10, 1948, Serial No. 20,219

3 Claims. (Cl. 318—452)

This invention relates to recording devices and more particularly to means for automatically instituting operation of a recording device at a predetermined time.

The instant invention is particularly directed to magnitic tape recorders wherein the magnetic tape wound on a reel is recorded upon as it winds up on a take-up reel. Such recorders are well known in the art and they include a variety of switches for controlling the starting, travel, stopping and reversal of traveling direction of the tape as well as other functions such as recording or play-back. One type of such apparatus is produced by the Brush Development Co., of Cleveland, Ohio, while another type is produced by the Amplifier Corp. of America, 398 Broadway, New York, N. Y. In view thereof, it is not considered necessary to illustrate the apparatus with which the instant invention is concerned except for those parts of the apparatus which are directly related to the invention.

In recording apparatus, a certain number of manual operations are necessary to record from either a microphone or from the output of a radio receiver or the like. However, it is often necessary or desirable to automatically record either the voice or a radio program in the absence of an operator. Such a necessity might arise, for example, if it is desired to record a radio program at a time when no one is present to operate the recorder.

Bearing the foregoing in mind, it is an object of the instant invention to provide supplementary equipment to be used with a conventional recorder and which makes possible the automatic unattended recording of programs or the like for a predetermined period of time, the apparatus simulating the manual motions generally required to effect this purpose. Allied with this object is the provision of such apparatus which, when not in use, does not interfere with the conventional operation of the recorder and which requires a minimum of additional elements so as to economize on cost of manufacture as well as to simplify its operation.

Other objects of my invention will be apparent from the following description, it being understood that the above general statements of the objects of my invention are intended to describe and not limit it in any manner.

The single figure in the drawing is a schematic circuit diagram illustrating the supplementary equipment and its connection to the relevant components of the recorder. Means for predetermining the operation of the apparatus is provided through the pre-selector timer 1 which is a schematic representation of a conventional clock-type mechanism for closing a circuit at predetermined times. An example of such a timer is any one of those produced by Telechron, Inc., of Ashland, Mass., Serial No. C28G1 being one of their types. Such a timer generaly includes series of contacts representing one-quarter hour periods. When any two contacts are pulled out, the timer will close a circuit during the time periods represented by the two contacts. For the sake of simplicity, two contacts, 2 and 3, are illustrated, these contacts closing at the predetermined times. The timer 1 is driven by motor 4 which is synchronous, and energized through the power lines 5 and 6 as will be apparent from the drawing. Plug 7 is inserted into a power outlet for this purpose. The same power also energizes the recorder through switch 8.

Timer 1 includes receptacles 1a and 1b which are connected across the power line through contacts 2 and 3. This arrangement is conventional for effectiving automatic operation of any electrical device plugged into the receptacle. Receptacle 1a may be the recorder receptacle, the recorder circuit being illustrated as connected therein, while receptacle 1b is the radio receptacle. Plugging the recorder into receptacle 1a will energize its circuits in a conventional manner so as to permit operation of the recorder. Such operation, in the instant case, includes energization of the recording or reproducing heads and motor operation for causing the tape to travel. Accordingly, the plug of both the recorder and a radio receiver are inserted into the timer receptacles so that both the recorder and the receiver become energized when the contacts 2 and 3 close. It is necessary that the on-off switch 8 of the recorder be closed so that the closing of contacts 2 and 3 completes the energizing circuit for both the recorder and receiver. It is also necessary, for the same reason, that the radio receiver switch be turned on and that it be tuned to the particular station the program of which it is desired to record.

The recorder includes a switch 9 which controls the operation of forward motor 10, the motor being designated as forward in that it drives the take-up mechanism and causes the tape to travel forwardly from the load reel. The apparatus further includes a record switch 11 the function of which is to effect operation of the recording head. In order to produce a record, it is ordinarily necessary to manually close switches 9 and 11 which closes the electrical circuit to the recording head, not shown, and to the forward motor 10 save for the open circuit at the starting switch 12. Starting switch 12 is generally spring-biased to open position and it is pressed down against the action of the spring so as to complete the circuit to the forward motor. The tape then starts to travel and wind around the take-up reel, pushing the tape-operated limit switch 13 as it travels in such forward direction. Switch 13 is spring-biased so as to normally rest at contact 14 representing an open circuit condition. When the tape begins its travel, it pushes switch 13 to terminal 15 so as to by-pass starting switch 12. Accordingly, switch 12 may be released whereupon the circuit will remain closed as long as the tape travels and presses against limit switch 13. It can be recognized, therefore, that in ordinary operation, the operator manually depresses switch 12 for a few seconds or until the movement of the tape has closed switch 13 against terminal 15. Switch 12 may then be released and the forward motor will continue operation.

In automatic operation such as herein described, it is necessary to simulate the temporary closing of switch 12 at the proper time and then to release it shortly thereafter. Triple-pole, double-throw switch 16 is employed to convert the apparatus from manual to automatic operation. In manual operation, switch 16 is thrown to the right so as to disable the elements of automatic operation and permit conventional operation. Accordingly, for automatic operation it is thrown to the left as viewed in the figure. Timer 1 having been set for the desired recording and the radio receiver having been turned on and tuned as above described, the forward switch 9 and record switch 11 are manually closed, the starting switch 12 remaining open due to its normal spring operation. When the contacts 2 and 3 of the clock close at the predetermined time, the forward motor gets voltage from line 6 at one of its terminals and through line 5, contact 3, contact 2, wire 17, switch 11, wire 18, switch arm 19, wire 20, tube 21, and wire 22 to the switch 9. This drives motor 10 forward so as to commence travel of the tape. Tube 21 is of the Amperex type having the normally closed contacts 23 and 24, contact 24 being a thermostat. A typical tube is the 6C10, the 6 representing the voltage, the C representing the normally closed contacts and the 10 representing the period of time in which the contacts will separate when subjected to the proper heat. Such heat is supplied through the heater 25.

In order to produce operation of tube 21, a transformer 26 is provided. The primary 27 of the transformer is energized through the switch contact 28 and wire 29 to the power line 6, the other end of the primary going through the contacts 2 and 3 to the line 5. Accordingly, at the same time that the forward motor is operated, the transformer is energized. The secondary 30 of transformer 26 serves to apply six volts to the heater 25 so that the contacts 23 and 24 separate in the delay time of the tube 21. A pilot light 31 serves to indicate operation of the transformer.

After ten seconds, contacts 23 and 24 will separate which would open the circuit to the forward motor except that the travelling tape closes tape operated limit switch 13 against contact 15 so that the forward motor is energized through the wire 17 and the following elements rather than through the delay tube 21. It can be seen, therefore, that the delay tube 21 has simulated manual operation of the starting switch 12 in that it, in effect, closes such switch for a short period of time and then opens it.

The tape will continue to travel from the load reel to the take-up reel as long as the contacts 2 and 3 are closed and as long as the supply lasts. If the tape should run down, switch 13 will open since there no longer is any closing pressure upon it. If, on the other hand, and as is more usual, the contacts 2 and 3 open according to the predetermined setting, both the recording apparatus and the radio receiver will discontinue operation. When the operator returns, it will be found that the desired program has been recorded on the tape during his absence and the recording may be played back when and if desired.

While there has been described what at present is considered a preferred embodiment of the invention, it will be evident that many changes and modifications may be made therein without departing from its spirit. It is therefore aimed in the appended claims to cover all such changes and modifications which fall within the true spirit and scope of the invention.

What is claimed is:

1. In a magnetic tape recording apparatus including a starter switch for initially starting an electrically operated forward tape driving motor, a limit switch operated by the contact of the travelling tape for energizing said motor when the starter switch is released and wherein operation of said forward motor causes said tape to travel and close the limit switch, the combination of means for automatically instituting operation of said apparatus, said means comprising a selector timer connected between said motor and a source of operating current for closing an electrical circuit to said motor during predetermined times, a delay tube having normally closed contacts included in said electrical circuit, said delay tube shunting said starter switch, and means controlled by said selector timer for opening the contacts of said delay tube after a predetermined period of time, the operation of said limit switch shunting said delay tube contacts whereby the opening of said contacts does not discontinue running of said motor.

2. Apparatus according to claim 1 and wherein one of said delay tube contacts is a thermostat, a heating element in said delay tube for separating said contacts, said means controlled by said selector timer for opening said contacts comprising a transformer, the primary of said transformer being energized through said selector timer and the secondary thereof being connected to said heater element.

3. Apparatus according to claim 2 and including a double-throw, triple-pole switch, one throw of said switch disconnecting said selector timer from said electrical circuit operating said motor and from said transformer and permitting normal operation of said motor, and the other throw of said switch operating to energize said transformer and said forward motor when said selector timer closes its said electrical circuit to said motor.

NATHAN M. HAYNES.

REFERENCES CITED

The following references are of record in the file of this patent:

UNITED STATES PATENTS

| Number | Name | Date |
|---|---|---|
| 2,032,190 | Thomas | Feb. 25, 1936 |
| 2,154,994 | Prescott | Apr. 18, 1939 |
| 2,200,105 | Stephenson | May 7, 1940 |
| 2,329,614 | Holmes | Sept. 14, 1943 |
| 2,341,135 | Baird | Feb. 8, 1944 |
| 2,366,415 | Lindsay | Jan. 2, 1945 |
| 2,367,363 | Matt | Jan. 16, 1945 |
| 2,368,761 | Hogan | Feb. 6, 1945 |
| 2,406,185 | Aubert | Aug. 20, 1946 |